United States Patent [19]
Park et al.

[11] Patent Number: 5,519,315
[45] Date of Patent: May 21, 1996

[54] PRINTED WIRING ASSEMBLY COPLANARITY INSPECTION FIXTURE

[75] Inventors: Joon Park, Glendale; Galon Melendy, Laguna Beach, both of Calif.

[73] Assignee: Hughes Aircraft Company, Los Angeles, Calif.

[21] Appl. No.: 332,206

[22] Filed: Oct. 31, 1994

[51] Int. Cl.$^6$ ................................................ G01B 7/02
[52] U.S. Cl. .......................................... 324/158.1; 33/533
[58] Field of Search .......................... 324/73.1, 158.1, 324/754, 755, 500; 439/482; 33/645, 533, 655, 613; 250/561

[56] References Cited

U.S. PATENT DOCUMENTS

| | | | |
|---|---|---|---|
| 4,774,768 | 10/1988 | Chiponis | 33/533 |
| 4,941,255 | 7/1990 | Bull | 33/645 |
| 4,996,439 | 2/1991 | Linker | 33/645 |
| 5,045,710 | 9/1991 | Linker, Sr. et al. | 250/561 |

*Primary Examiner*—Vinh P. Nguyen
*Attorney, Agent, or Firm*—Leonard A. Alkov; W. K. Denson-Low

[57] ABSTRACT

A coplanarity inspection fixture for use in determining the coplanarity of a printed wiring assembly with respect to its edge connector. The fixture measures the deviation in parallelism between respective card guides of the printed wiring assembly and the centerline of the edge connector. The fixture includes a frame, a linear bearing block affixed to the frame, a rotational bearing block disposed above the linear bearing block, and a pin slot block fastened to the rotational bearing block. The pin slot block includes a plurality of slots for receiving the rows of pins of the edge connector. Left and right support members are vertically disposed on the frame for guiding and aligning the card guides so that the plurality of rows of connector pins of the connector mate with the slots in the pin slot block. A plurality of clamping jaw assemblies are affixed to the left and right support members that are adjustable to selectively grip a calibration template to calibrate the fixture, and thereafter to calibrate the printed wiring assembly that is to be inspected. Left and right indicators contact the pin slot block adjacent the respective support members along the centerline of the pin slot block, and are zeroed using the calibration template. After calibration, the indicators are used to measure the relative deviation of the centerline of the edge connector with respect to the card guides, which determines the deviation in parallelism between respective card guides and the centerline of the edge connector, whose centerline is designed to be coplanar with the respective centerlines of the card guides.

5 Claims, 5 Drawing Sheets

PRINTED WIRING ASSEMBLY COPLANARITY INSPECTION FIXTURE

BACKGROUND

The present invention relates generally to printed wiring board assemblies, and more particularly, to a coplanarity inspection fixture for use in determining the coplanarity of a printed wiring assembly with respect to an attached edge connector.

When a printed wiring board module assembly is installed into a backplane, two card guides provide alignment during insertion of an edge connector with a mating receptacle. If the attached edge connector is not correctly aligned with the printed wiring board module, in that it is not parallel and/or is offset, the connector pins on the edge connector may be bent or damaged during connector mating. The present invention provides for apparatus that quickly and accurately inspects the alignment between the printed wiring board module and edge connector prior to pin insertion and/or mating, thereby minimizing the possibility of damaging or bending the pins of the edge connector and the mating sockets on the mating connector.

There is no known prior art relating to printed wiring board module coplanarity inspection fixtures. Previously the inspection process supplanted by the present invention required specialized inspection equipment, such as a coordinate machine. Inspection procedures perfomed using a coordinate machine are complex and require specialized inspectors.

In view of the above, it is an objective of the present invention to provide for a coplanarity inspection fixture for use in determining the coplanarity of a printed wiring assembly with respect to an attached edge connector. Another objective of the present invention is to provide for a coplanarity inspection fixture that prevents damage and/or excessive bending of connector pins and/or sockets of accurate standard avionics modules prior to final connector mating. Yet another objective of the present invention is to provide a simplified means to inspect the coplanarity of a module with respect to an attached edge connector, directly on a production floor without requiring a coordinate machine and/or specialized inspection equipment and procedures. A further object of the present invention is to provide a coplanarity inspection fixture that minimizes labor costs associated with coplanarity inspection and does not require specialized, high cost, personnel to operate it.

SUMMARY OF THE INVENTION

In order to provide for the above and other objectives, the present invention is a coplanarity inspection fixture for use in determining the coplanarity of a printed wiring assembly with respect to an attached edge connector. The coplanarity inspection fixture may be used in a procedure for inspecting the coplanarity of a standard avionics module (SAM), for example, with respect to its edge connector. The coplanarity inspection fixture measures the deviation in parallelism between respective card guides of the printed wiring assembly and the centerline of the edge connector, whose centerline is designed to be coplanar with the respective centerlines of the side card guides.

More particularly, the coplanarity inspection fixture comprises a frame, a linear bearing block affixed to the frame, a rotational bearing block disposed above the linear bearing block, and a pin slot block fastened to the rotational bearing block. The pin slot block comprises a plurality of slots for receiving the plurality of rows of connector pins of the edge connector. Left and right support members are vertically disposed on the frame for guiding and aligning the card guides of the printed wiring assembly so that the plurality of rows of connector pins of the connector mate with the slots in the pin slot block. A plurality of clamping jaw assemblies are affixed to the left and right support members that are adjustable to selectively grip a calibration template to calibrate the fixture, and thereafter to calibrate the printed wiring assembly that is to be inspected.

Left and fight indicators contact the pin slot block adjacent the respective support members along the centerline of the pin slot block and are zeroed using the calibration template. The calibrated centerline represents a "perfect" module centerline and serves as a reference plane for subsequent measurements. After calibration, the indicators are used to measure the relative deviation of the centerline of the edge connector with respect to the card guides, which determines the deviation in parallelism between respective card guides of the printed wiring assembly and the centerline of the edge connector, whose centerline is designed to be coplanar with the respective centerlines of the card guides.

The inspection task is accomplished by inserting the attached edge connector of a standard avionics module into the pin slot block of the inspection fixture, which accurately positions the edge connector for subsequent measurement readings. The pin slot block mates with the rows of pins of the edge connector and serves to define the plane coincident with the centerline of the edge connector. The pin slot block is mounted to a rotational bearing and a linear bearing that allows rotational and linear degrees of freedom respectively. The standard avionics module is then clamped by four clamping jaw assemblies. The clamping jaw assemblies are calibrated to provide a symmetrical gripping action such that when all of the clamping jaw assemblies are fully camped, the centerline of the standard avionics module is defined therein.

When standard avionics modules are inspected, digital readings of the indicators measure any rotational and/or linear misalignment of the edge connector with respect to the body of the module, a task that previously required a coordinate machine and specialized inspection procedures. The present invention thus inspects the coplanarity of the body of a standard avionics module with respect to its attached edge connector, thereby checking for potential connector mating and/or connector pin damage problems prior to subsequent connector mating and assembly operations.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
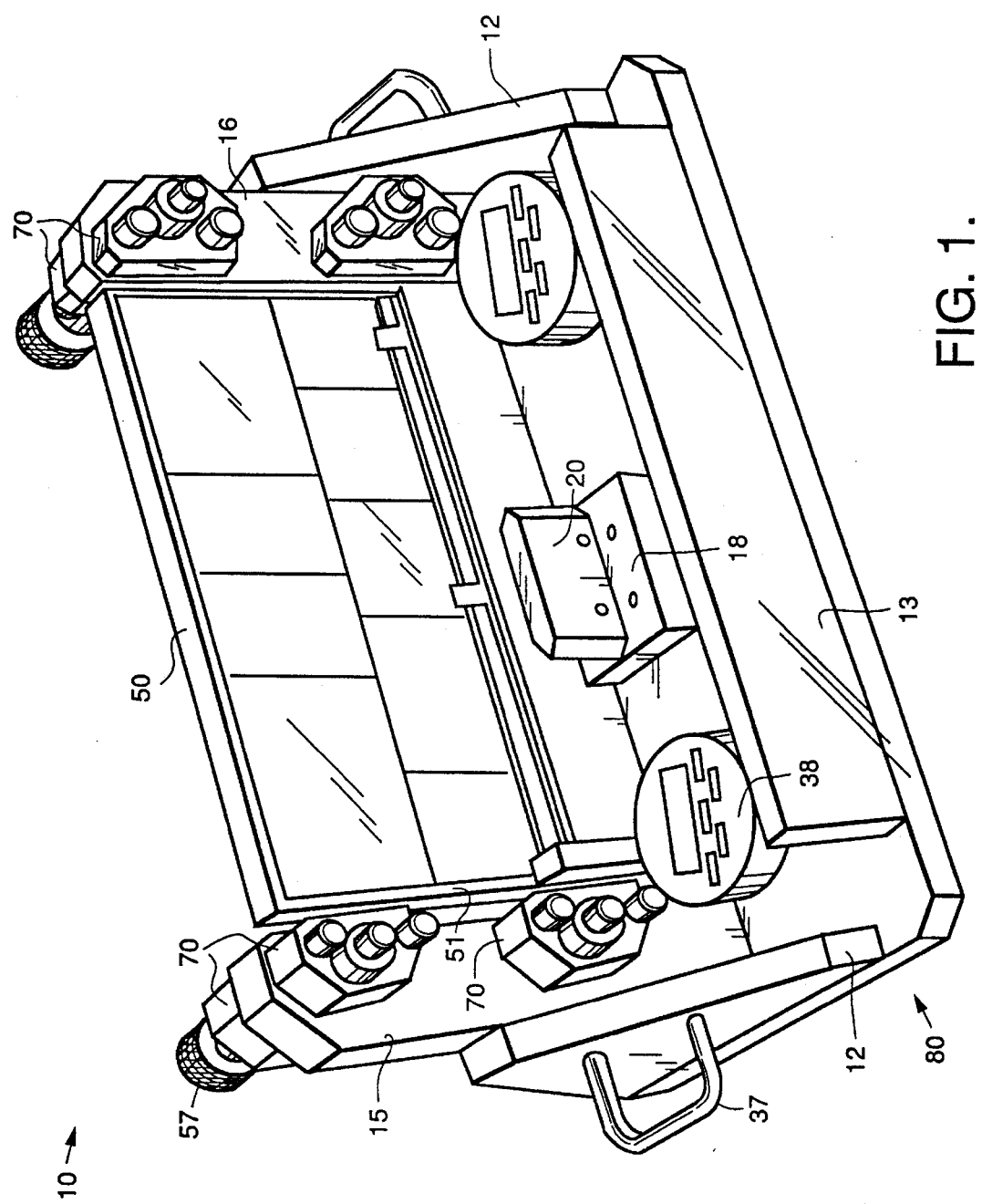
FIG. 1 is a perspective view of a coplanarity inspection fixture in accordance with the principles of the present invention.
Figure 2:
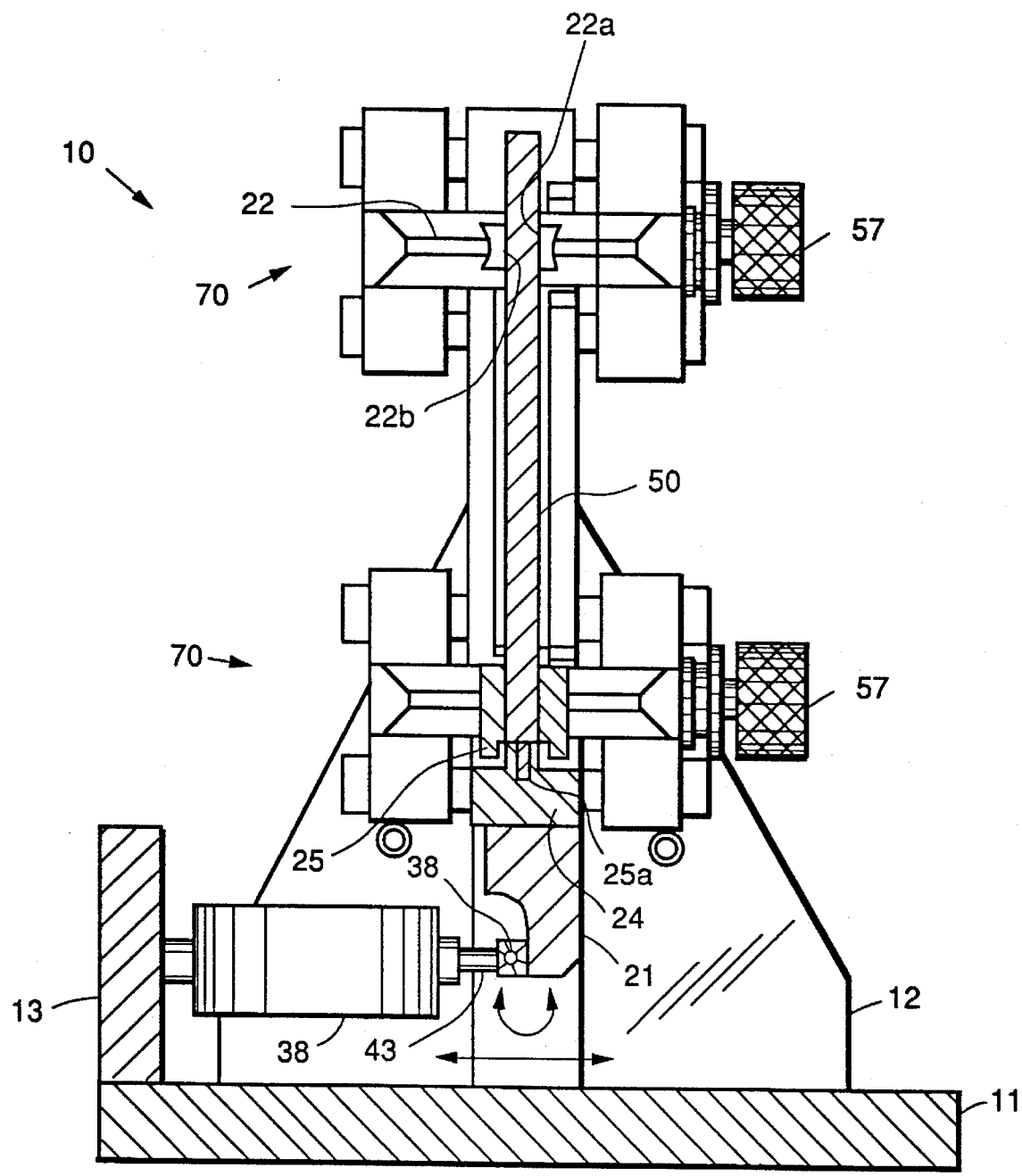
FIG. 2 shows a sectional view of the coplanarity inspection fixture of FIG. 1.
Figure 3:
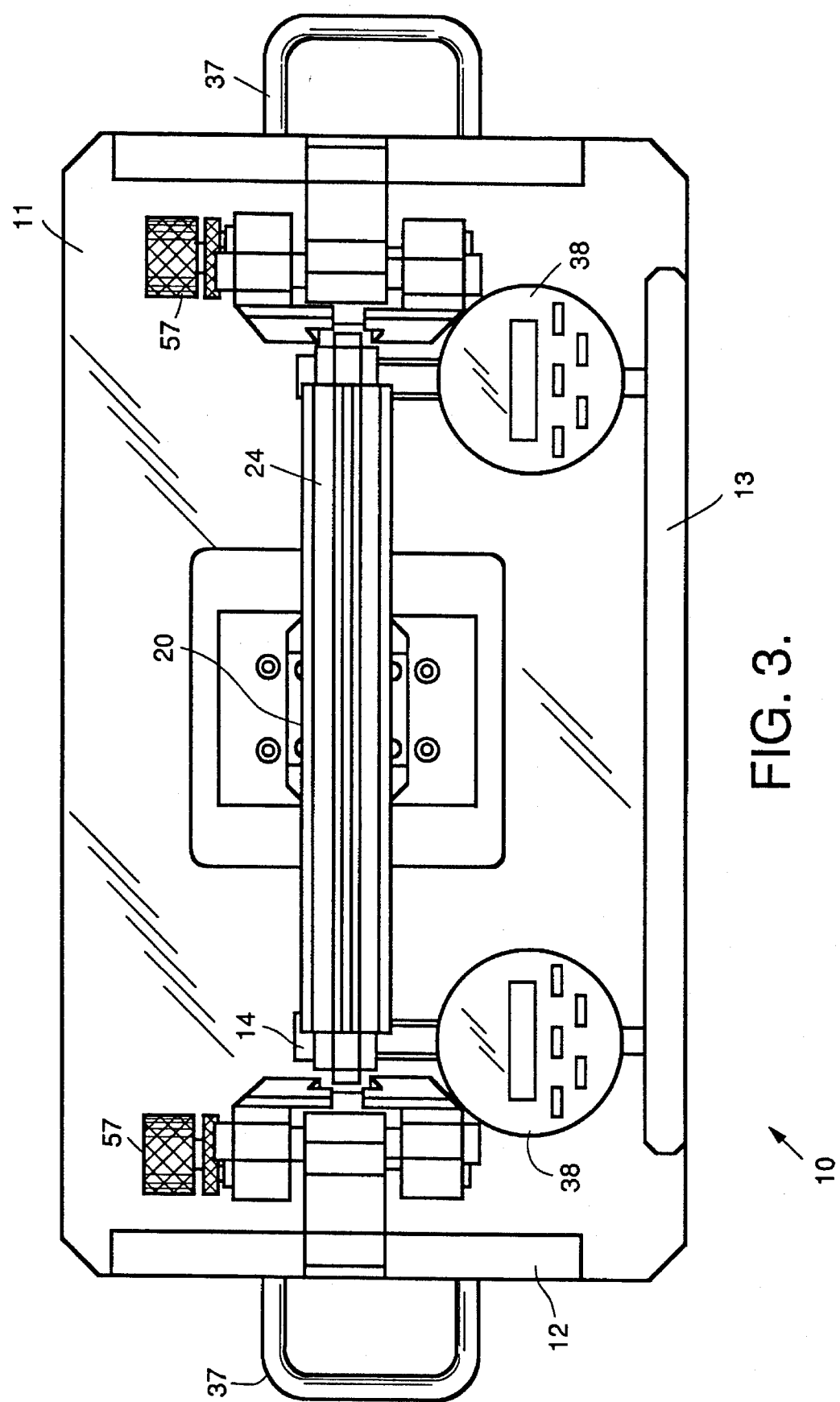
FIG. 3 shows a top view of the coplanarity inspection fixture of FIG. 1.
Figure 4:
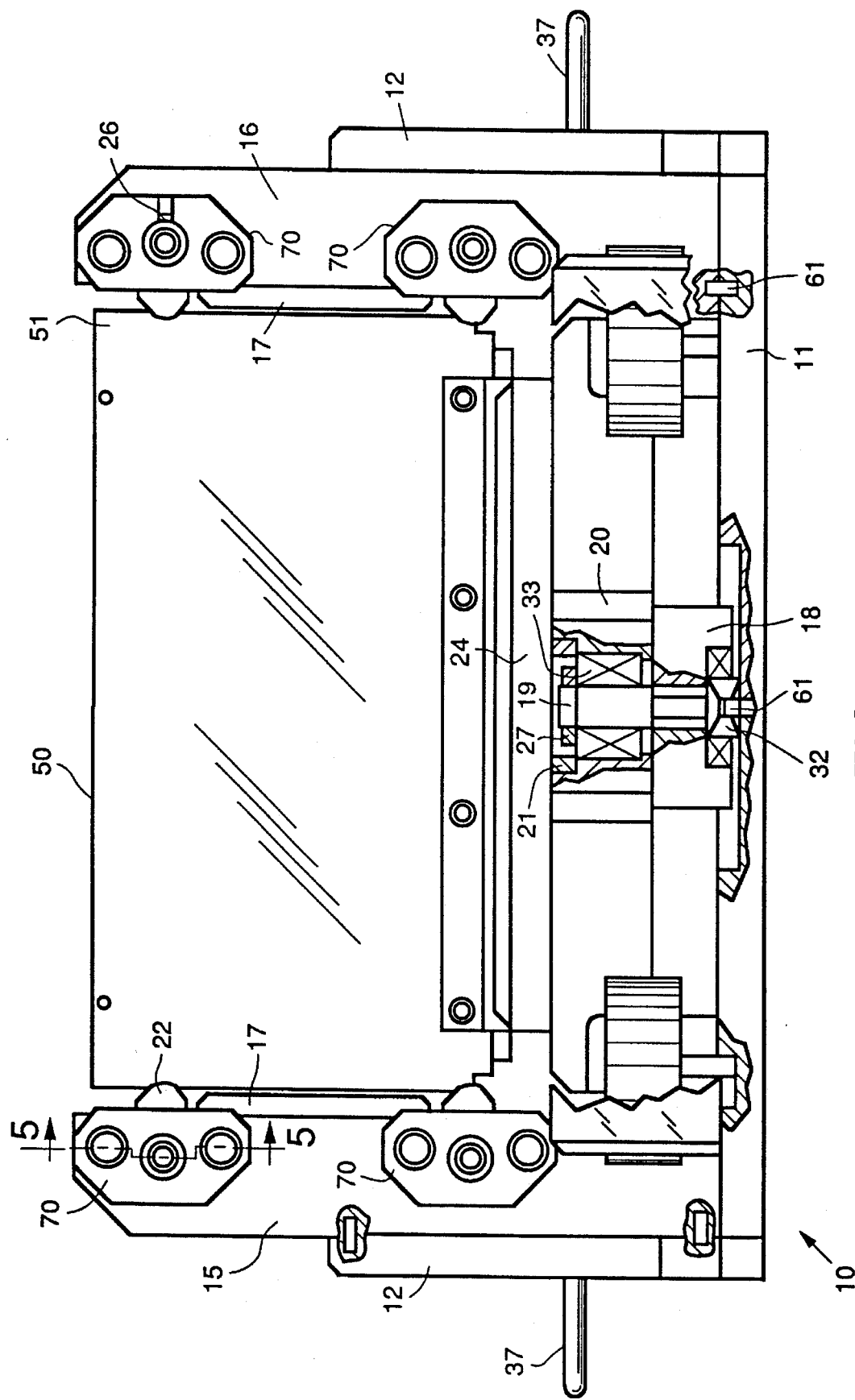
FIG. 4 shows a partially cutaway side view of the coplanarity inspection fixture of FIG. 1.

Referring to the drawing figures, FIG. 1 is a perspective view of a coplanarity inspection fixture in accordance with the principles of the present invention. FIGS. 2, 3 and 4 show sectional, top, and partially cutaway side views of the coplanarity inspection fixture 10 of FIG. 1.

With reference to FIGS. 1–4, the coplanarity inspection fixture 10 is comprised of a housing 80 or frame 80, comprising a base plate 11, two side plates 12, a front plate 13, a left thrust screw block 15, and a right thrust screw block 16. Two handles 37 are attached to the side plates 12. A linear bearing block 18 is mounted to the base plate 11. A rotational bearing block 20 is disposed above the linear bearing block 18. A pin slot block 24 is fastened to the rotational bearing block 20. For the purposes of calibration, a master calibration template 51 is caused to fully engage the pin slot block 24. The calibration template is a replica of a standard avionics module 50 whose card guides and edge connector are coplanar.

Two indicators 38 register from the rotational bearing block 20 at a position that is coincident with the centerline of the pin slot block 24 and the centerline of the template 51, and subsequently the centerline of the installed standard avionics module 50. The left and right thrust screw blocks 15, 16 provide support for four clamping jaw assemblies 70. Each clamping jaw assembly 70 has a rotatable knob 57 that tightens each assembly relative to the template 51 or standard avionics module 50. Details of the clamping jaw assemblies 70 are described hereinafter with respect to FIG. 5.

Referring to FIGS. 2 and 3, they show sectional and top views of the coplanarity inspection fixture 10. The standard avionics module 50 is shown having rows of connector pins 25a of its edge connector 25 inserted into slots 24a in the pin slot block 24. The two indicators 38 register at a position relative to the rotational bearing block 20 that is coincident with the centerline of the pin slot block 24 and the centerline of the template 51, and the centerline of the installed standard avionics module 50. Spring plunger mounts 14 (FIG. 3) serve to support the indicators 38 and house spring plungers 43, which provide a constraint in conjunction with spring loaded indicator tips 38a of the indicators 38, to excessive linear and rotational translation of the rotational bearing block 20.

With reference to FIG. 4, the linear bearing block 18 supports a shaft 19, and is mounted to a crossed roller way 32. The rotational bearing block 20 comprises a tapered roller bearing 33 and bearing cup (not shown) surrounding the bearing 33 that rides on the shaft 19. A tapered bearing nut 27 secures the tapered roller bearing 33 at the end of the shaft 19. The pin slot block 24 is fastened to the rotational bearing block 20, and the template 51 or standard avionics module 50 is caused to fully engage the pin slot block 24. A cover plate 21 is provided to seal the bearing 33. A dowel pin 61 is used to secure the crossed roller way 32.

The left and right thrust screw blocks 15, 16 provide support for the four clamping jaw assemblies 70. Two side guides 17 are fastened to the left and right thrust screw blocks 15, 16, respectively, and serve to guide and align the standard avionics module 50 during loading and unloading operations.

Figure 5:
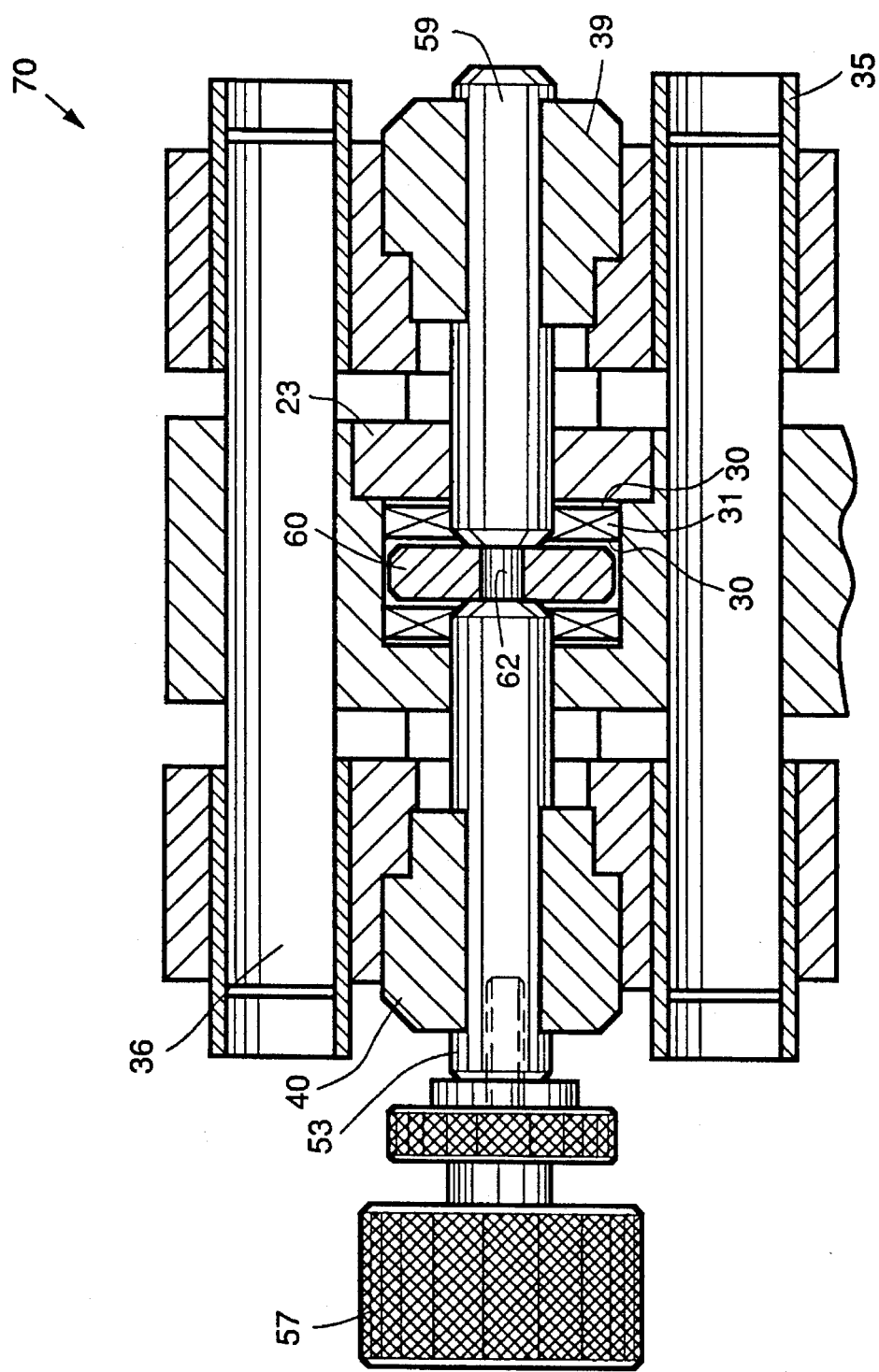
FIG. 5 shows a sectional view of the clamping jaw assemblies used in the coplanarity inspection fixture of FIG. 1.

Details of the clamping jaw assemblies 70 are provided with reference to FIG. 5. A bearing cover plate 23 mounts on the left and right thrust screw blocks 15, 16 and serves to retain a set of thrust washers 30 and needle roller bearings 31 that "sandwich" a coupler 60, thereby constraining it from linear translation. The clamping jaw assemblies 70 are comprised of clamp blocks 22 (FIGS. 2 and 4) that house bushings 35 and are guided by shafts 36. Left hand and right hand thrust screws 58, 59 engage threads of left and right nuts 40, 39 respectively, and are fastened together by a dowel pin 62 that passes through the coupler 60. The torque knobs 57 serve to limit the applied torque during clamping operations. A nylon plug 26 is used in each clamping jaw assembly 70 to lock the left and right nuts 40, 39 to desired positions. The clamping surfaces 22a, 22b are caused to move toward the surfaces of the template 51 or standard avionics module 50 and further movement is controlled by the torque knobs 57.

The coplanarity inspection fixture 10 provides for clamping a standard avionics module 50 and then checking or inspecting the coplanarity of an attached edge connector 25. While the immediate value of the present invention is for inspection of standard avionics modules as outlined herein, potential applications of the present invention are by no means limited to such applications, and may be readily extended by those skilled in the art.

In operation, the two indicators 38 are initially "zeroed" out at a calibrated centerline utilizing the master template. The calibrated centerline represents a "perfect" centerline for the standard avionics module 50 and serves as a reference plane for subsequent measurements of such modules 50.

The inspection task is accomplished by inserting the attached edge connector 25 of the standard avionics module 50 into the pin slot block 24 of the inspection fixture 10, which accurately positions the edge connector 25 for subsequent measurement readings. The pin slot block 24 mates with the rows of pins 25a of the edge connector 25 and serves to define the plane coincident with the centerline of the edge connector 25. The pin slot block 24 is mounted to the rotational bearing block 20 and linear bearing block 18 which allows rotational and linear degrees of freedom respectively. The standard avionics module 50 is then clamped using the four clamping jaw assemblies 70. The clamping jaw assemblies 70 are calibrated to provide a symmetrical gripping action such that when all of the clamping jaw assemblies 70 are fully camped, the centerline of the standard avionics module 50 is defined therein.

Any rotational and/or linear misalignment of the edge connector 25 with respect to the centerline of the standard avionics module 50 causes a corresponding rotational and/or linear movement of the pin slot block 24 and rotational bearing block 20 to which pin slot block 24 is fastened. Likewise, movement of rotational bearing block 20 causes movement of indicator tips 38a. Movement of the indicator tips 38a is sensed by indicator 38 which then displays a measurement corresponding to the deviation from the "zero" calibration setting. The inspection fixture 10 inspects the coplanarity of a standard avionics module 50 with respect to its attached edge connector 25, thereby checking for potential connector mating and/or connector pin damage problems prior to subsequent connector mating and assembly operations.

Thus there has been described a new and improved coplanarity inspection fixture for use in determining the coplanarity of a printed wiring assembly with respect to an attached edge connector. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A coplanarity inspection fixture for use in determining the coplanarity of card guides of a printed wiring assembly relative to an edge connector having a plurality of rows of connector pins, said fixture comprising:

a frame;

a linear bearing block affixed to the frame;

a rotational bearing block disposed above the linear bearing block;

a pin slot block fastened to the rotational bearing block that comprises a plurality of slots for receiving the plurality of rows of connector pins of the edge connector;

left and right support members for guiding and aligning the card guides of the printed wiring assembly so that the plurality of rows of connector pins of the connector mate with the slots in the pin slot block;

a plurality of clamping jaw assemblies affixed to the left and right support members that are adjustable to selectively grip a calibration template to calibrate the fixture, and thereafter to measure the coplanarity of the printed wiring assembly that is to be inspected; and left and right indicators that contact the rotational bearing block in the area adjacent the respective support members along the centerline of the pin slot block, and that are calibrated using the calibration template, and that are used to measure the relative deviation of the centerline of the edge connector with respect to the card guides, thus measuring the deviation in parallelism between respective card guides of the printed wiring assembly and the centerline of the edge connector, whose centerline is designed to be coplanar with the respective centerlines of the card guides.

2. The fixture of claim 1 wherein the support members comprises:

left and right thrust screw blocks: and left and right side guides are fastened to the left and right thrust screw blocks, respectively, for guiding and aligning the printed wiring assembly.

3. The fixture of claim 2 wherein the frame comprises:

a base plate;

left and right side plates vertically secured to the base plate;

wherein said left thrust screw block secured to the left side plate; and wherein said right thrust screw block secured to the right side plate.

4. The fixture of claim 1 wherein each clamping jaw assembly comprises: left and right sets of thrust washers;

a needle roller bearing disposed between respective washers of each set of washers;

a coupler disposed between left and right sets of thrust washers which is constrained from linear translation:

a plurality of clamp blocks for clamping the card guides;

left hand and tight hand thrust screws disposed through the coupler; and a torque knob coupled to a selected one of the thrust screws for limiting applied torque during clamping of the printed wiring assembly.

5. The fixture of claim 1 wherein the rotational bearing block comprises:

a crossed roller way;

a shaft affixed to the crossed roller way;

a tapered roller bearing that rides on the shaft; and a tapered beating nut that secures the tapered roller bearing at the end of the shaft.

* * * * *